Figure 1:
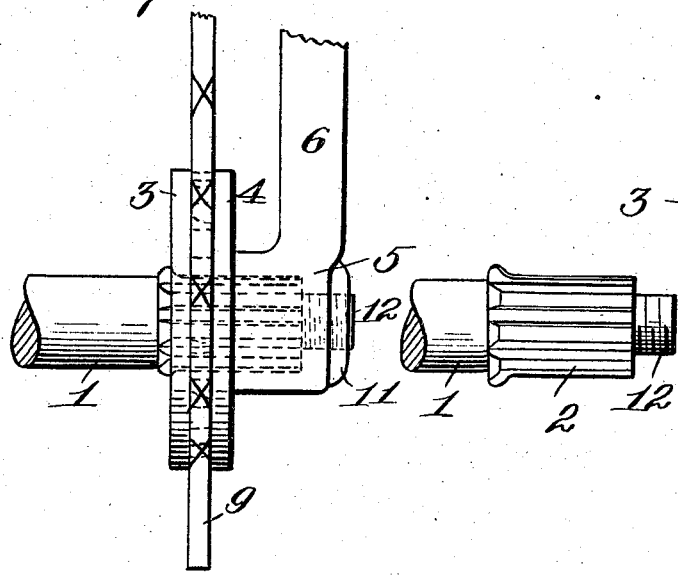

No. 785,071. PATENTED MAR. 14, 1905.
J. V. PUGH.
FASTENING FOR WHEELS, SHAFTS, AND CRANKS.
APPLICATION FILED NOV. 16, 1904.

4 SHEETS—SHEET 1.

Witnesses:
G. D. Kesler
N. L. Bogan

Inventor
John V. Pugh
By James L. Norris.
Atty.

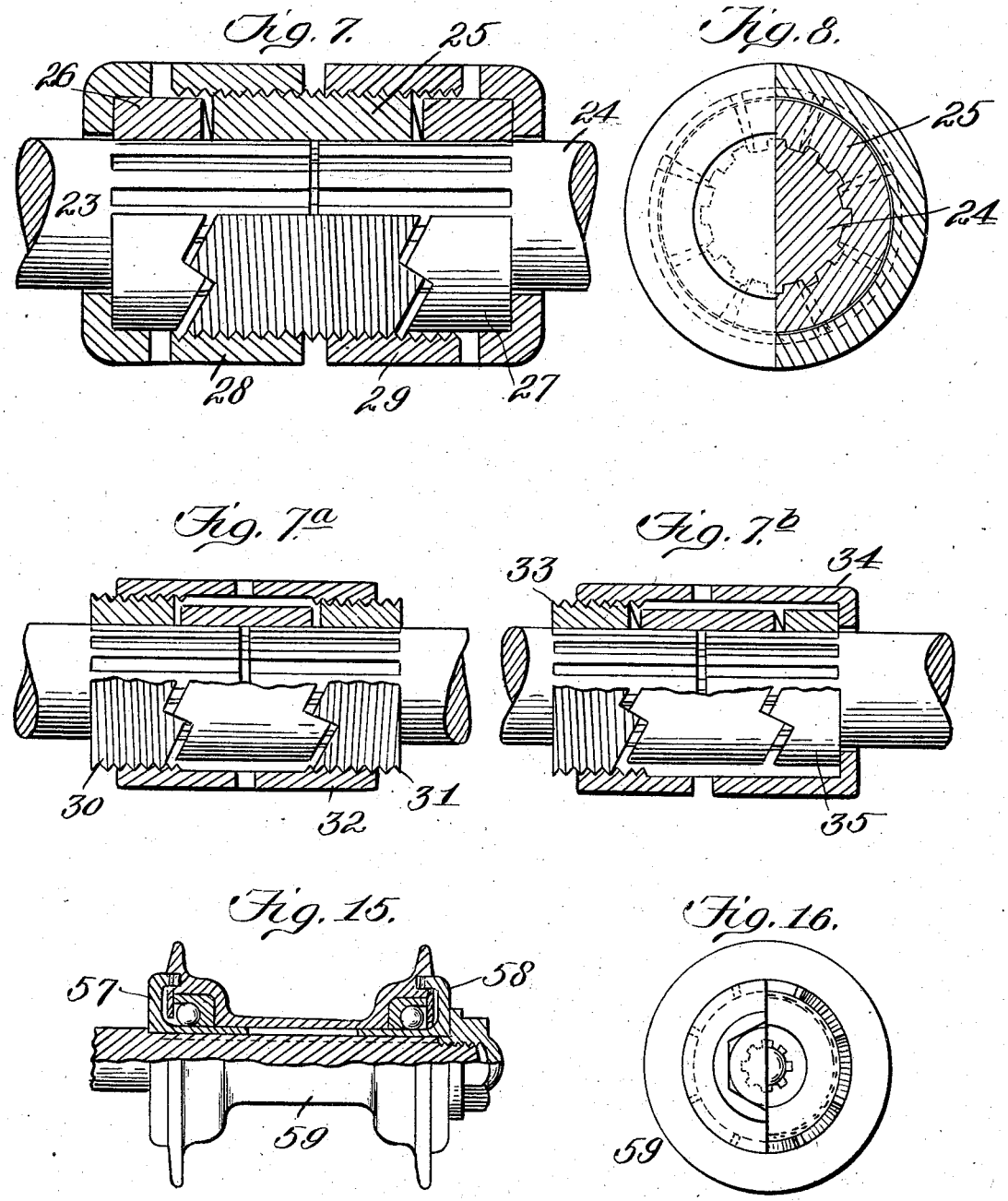

No. 785,071. PATENTED MAR. 14, 1905.
J. V. PUGH.
FASTENING FOR WHEELS, SHAFTS, AND CRANKS.
APPLICATION FILED NOV. 16, 1904.

4 SHEETS—SHEET 3.

Witnesses:
C. D. Kesler
N. L. Bogan

Inventor
John V. Pugh
By
James L. Norris
Atty.

No. 785,071. PATENTED MAR. 14, 1905.
J. V. PUGH.
FASTENING FOR WHEELS, SHAFTS, AND CRANKS.
APPLICATION FILED NOV. 16, 1904.

4 SHEETS—SHEET 4.

Witnesses:
N. L. Bogan
C. D. Kesler

Inventor
John V. Pugh
By James L. Norris
Atty.

No. 785,071.

Patented March 14, 1905.

UNITED STATES PATENT OFFICE.

JOHN VERNON PUGH, OF ALLESLEY, ENGLAND.

FASTENING FOR WHEELS, SHAFTS, AND CRANKS.

SPECIFICATION forming part of Letters Patent No. 785,071, dated March 14, 1905.

Original application filed May 9, 1904, Serial No. 207,124. Divided and this application filed November 16, 1904. Serial No. 233,020.

*To all whom it may concern:*

Be it known that I, JOHN VERNON PUGH, a subject of the King of England, residing at Allesley, England, have invented certain new and useful Improvements in Fastenings for Wheels, Shafts, and Cranks, of which the following is a specification.

This invention relates to certain new and useful improvements in fastenings for wheels shafts, and cranks, which is a division of the subject-matter originally disclosed in application, Serial No. 207,124, filed May 9, 1904; and the object thereof is to improve the structure set forth in Patent No. 738,065, dated September 1, 1903.

In order that the present invention may be better understood, reference will be had to the structure disclosed in the patent referred to, and such structure consists of a member having grooves, a second member provided with ribs or keys extending into said grooves and provided on its outer face with ratchet-teeth, a third member provided with internal ribs or keys also extending into said grooves and further provided on its inner face with ratchet-teeth engaging those of the second member, and means for holding the sets of ratchet-teeth into engagement.

The present invention, as more specifically set forth hereinafter, briefly described, involves a longitudinal-grooved element, a plurality of internal-ribbed members having their ribs engaging the grooves of said element, each of said members having a toothed face, a toothed member interposed between and engaging the teeth of said ribbed members and adapted to cause the interlocking of all of said members together, and means for clamping said element and members together.

In describing the invention in detail, reference is had to the accompanying drawings, forming a part of this specification, and wherein like reference characters denote corresponding parts throughout the several views, and in which—

Figure 2:
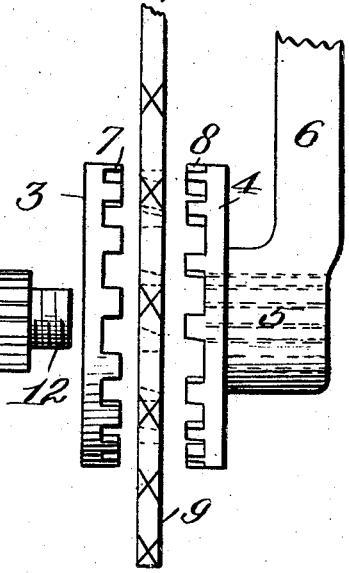
Figure 3:
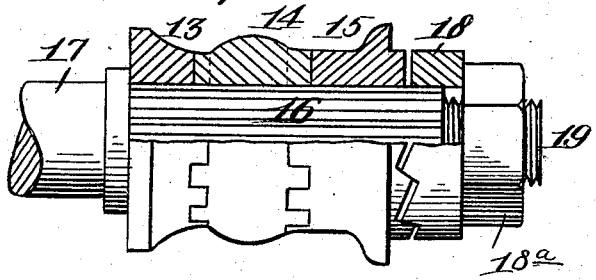
Figure 4:
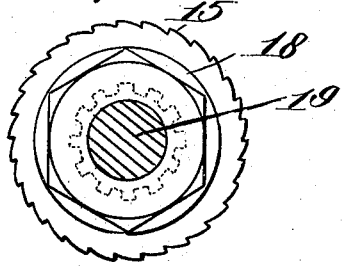
Figure 5:
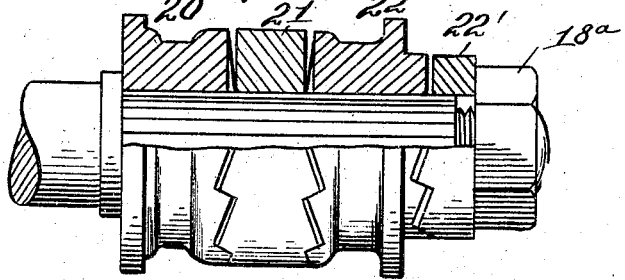
Figure 6:
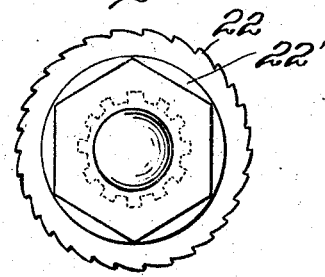
Figure 9:
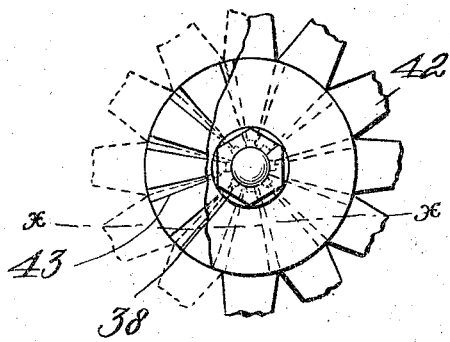
Figure 11:
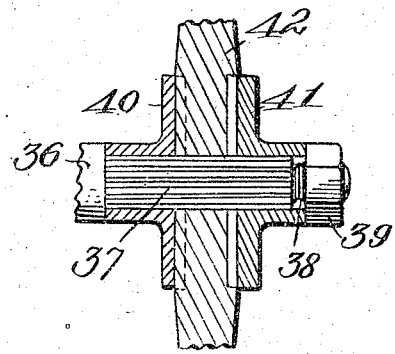
Figure 10:
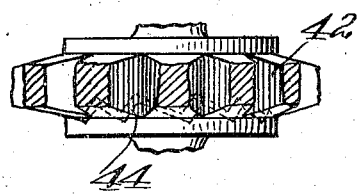
Figure 13:
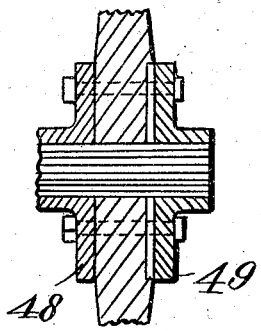
Figure 12:
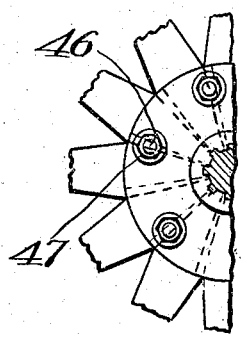
Figure 14:
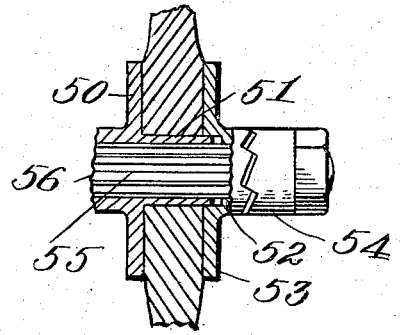
Figure 17:
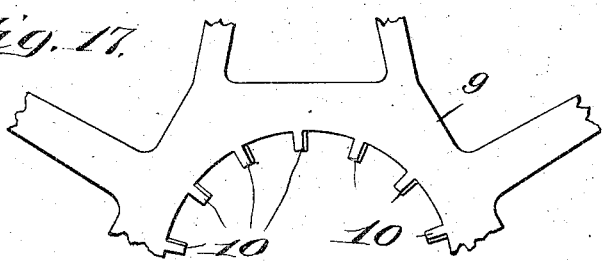
Figure 18:
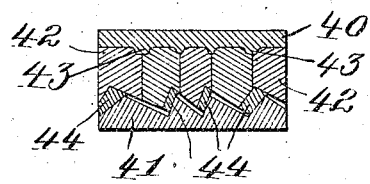
Figure 19:
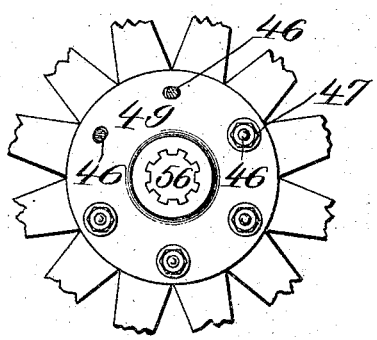

Figure 1 represents in end elevation a fastener constructed in accordance with this invention as applied to a crank and chain-wheel. Fig. 2 is a view of the parts constituting the fastener illustrated in Fig. 1 separated. Fig. 3 represents, partly in vertical section and partly in side elevation, a modified form of fastener constructed in accordance with this invention as applied to the fixing of a rotary milling-tool or cutter to its spindle, the milling-teeth being omitted. Fig. 4 is an end view of the fastener shown in Fig. 3 with the milling-teeth represented. Fig. 5 illustrates, partly in vertical section and partly in side elevation, another modification of a fastener constructed in accordance with this invention as applied to a rotary milling-cutter, the milling-teeth being omitted. Fig. 6 is an end elevation of the structure shown in Fig. 5, but with the milling-teeth represented. Fig. 7 illustrates, partly in side elevation and partly in vertical section, a modified form of fastener constructed in accordance with this invention as applied for the coupling of two shafts end to end or in line. Fig. 8 illustrates the structure shown in Fig. 7 partly in end elevation and partly in cross-section. Figs. 7$^a$ and 7$^b$ illustrate modified constructions of some of the parts shown in Figs. 7 and 8. Fig. 9 illustrates in side elevation (the parts at one side being broken away) a modified form of fastener constructed in accordance with this invention for the fixing of wooden-spoked vehicle-wheels on the ends of the wheel-axle. Fig. 10 is a plan of a portion of the structure shown in Fig. 9. Fig. 11 is a vertical section of the axle and also showing the end fixing-nut in elevation in connection with the structure illustrated in Fig. 9. Fig. 12 illustrates in side elevation a portion of a wooden-spoked wheel in which the parts are secured together by a series of screw bolts and nuts instead of by a screw-nut taking on a screw-threaded part on the end of the axle, as illustrated in Figs 9, 10, and 11. Fig. 13 is a vertical section of the wheel as shown in Fig. 12. Fig. 14 is another modified form of the wooden-spoked wheel. Fig. 15 illustrates half in vertical section and half in elevation a fastener constructed in accordance with this invention for the fixing of a wire-spoked wheel to its axle. Fig. 16 represents the structure shown in Fig. 15 in end elevation, portions at the right-hand half of Fig. 16 being broken away. Fig. 17 is a side elevation, broken away, of the chain-wheel shown in Figs. 1 and 2. Fig. 18 is a section on line $x\ x$ of Fig. 9, and Fig. 19 is a side elevation of the structure shown in Figs. 12 and 13.

Referring to Figs. 1 and 2 of the drawings, 1 denotes an axle (a portion of which only is represented) having in its end 2 a series of grooves or flutes. Onto the fluted or grooved end 2 of the crank-axle 1 the plate 3 of the pair of plates 3 4 is passed. The plate 4 is formed on the inner end of the boss 5 of the crank 6. The plate 3 has one of its faces provided with teeth, as at 7, and the plate 4 has one of its faces provided with teeth, as at 8. The plates 3 4 are provided with internal ribs adapted to engage in the grooves of the portion 2 of the axle 1. The reference character 9 denotes the chain-wheel, which is mounted upon the teeth of the plates 3 and 4. The wheel 9 is provided with radial projections 10. The outer plate 4, as stated, is formed on the inner end of the boss of the crank 6, and the inclined bearing-faces of the teeth or projections on the plate 4, which tend to rotate the internally-ribbed parts on the crank-axle, are formed on one side only of the said teeth or projections, the other sides of the said teeth or projections being plain. The plain or uninclined sides of the projections on the plates 3 4 slide into juxtaposition, but with a slight clearance between them, prior to their rotation, the inclined sides of the projections on the plate 4 bearing against correspondingly-inclined sides of radial projections 10 on the wheel 9, as is indicated in dotted lines in Fig. 2. Thus it will be understood that when the parts are tightened up by the screwing of the screw-nut 11 on the terminal screw 12 the chain-wheel 9 and plate 3 are forced rotatively in one direction on the crank-axle, while the crank 6 and plate 4, in one piece therewith, are forced rotatively in the opposite direction, the internal ribs of the two parts being thereby practically locked by frictional contact in the grooves or flutes of the crank-axle 1.

According to the structure shown in Figs. 3 and 4 the milling-tool or cutter is made up of parts marked, respectively, 13 14 15, although it may be made up of any number of parts. The parts engage together by the interlocking or engagement of projections on their adjacent ends. The first part 13 and final part 15 are internally ribbed to engage with the grooves or flutes in the end 16 of the spindle 17; but the parts 14 15 are of a circular figure internally and are of a size proper to fit the exterior of the ribs of the part 16 of the spindle 17. The outer face of the final or end part 15 of the milling-cutter is made with ratchet-teeth for face ratchet-teeth on an internally-ribbed ring 18 to bear against, the parts being kept in engagement by the screw-nut 18ª taking on the screwed part 19 of the spindle. If desired, the ring 18 may be formed with milling-teeth on its periphery.

In the construction shown in Figs. 5 and 6 each of the parts 20, 21, 22, and 22' is internally ribbed to engage with the longitudinal grooves or flutes in the spindle. In this arrangement the presented faces or ends of the several parts have inclined or face ratchet-teeth, as is best seen in the lower half of Fig. 5. The ratchet-like teeth at the two ends of each part are oppositely inclined.

In applying the invention to the coupling of two shafts end to end or in line the ends of the two shafts 23 24, Figs. 7 and 8, are longitudinally grooved or fluted. A triple arrangement of internally-ribbed parts (marked, respectively, 25, 26, and 27) is employed to engage the grooved ends of the shafts. The middle part 25 is externally screwed and constitutes the carrier for a pair of flanged ferrules 28 29, by the screwing on of which the parts 26 27 are made to bear on the ends of the middle part 25, or the middle part 25 may be plain, as is represented in Fig. 7ª, the parts 30 31 being screwed with right and left handed screw-threads, respectively, for the engagement therewith of corresponding internal screw-threads of a sleeve 32, or one only of the end parts—for example, the end part 33—may be screwed, as is represented in Fig. 7ᵇ, the other end of the sleeve 34 having a flange to engage with the end part 35.

When the parts of the coupling are assembled, the outer or end parts 26 27 are so adjusted that their internal ribs coincide or are in line with the internal ribs of the middle part 25. The longitudinally-grooved ends of the coupling are then passed endwise into the coupling until they meet or nearly meet at the middle of the part 25. The screw-ferrules 28 29 are then rotated in the direction proper to advance the parts 26 27 against the middle part 25, when the three parts 25, 26, and 27 become by the action of their face ratchet-teeth on one another so firmly fixed on the ends of the two shafts that the two shafts rotate as one.

In applying my invention to the fixing of wooden-spoked wheels for vehicles to their axles I construct and arrange the parts as is represented in Figs. 9, 10, and 11, and in which 36 is the axle, 37 its longitudinally grooved or fluted end, and 38 the terminal screw for the reception of the tightening and fixing nut 39. The two internally-ribbed parts which engage with the part 37 of the axle have the form of circular metallic plates 40 41, between which the wooden spokes 42 are gripped. The plate 40 has on the face presented to the spokes a series of radial ribs or teeth 43, (on the left-hand side of Fig. 9, where a portion of the outer plate 41 and spokes are broken away.) The radial ribs 43 engage in grooves formed at one side of the meeting ends of the spokes 42, and thus insure the locking of the spokes 42 to the plate 40. The other or outer side of the practically solid nave formed by the inner ends of the spokes has face ratchet-teeth formed thereon, the bearing or more inclined sides of which are covered with metal plates 44. (See Fig. 10.) The inner face of the outer plate 41 has ratchet-teeth to engage and bear on those on the outer face of the spokes, as is best seen in Fig. 10, the parts being forced together and locked on the axle 36 by the screwing up of the screw-nut 39.

The screw-nut 39 and threaded end 38 of the axle 36 may be dispensed with by providing for the tightening up of the parts by a series of screw-bolts 46 and nuts 47, as is represented in Figs. 12 and 13; but in this case the holes in the side plates and nave of the wheel must be of such a diameter or so shaped, as is indicated in dotted lines in Fig. 12, as to permit the plates 48 49 to turn slightly in opposite directions as the bolts are screwed tightly up.

In the construction Fig. 14 the disk or plate 50 has an outwardly-extending tubular bush 51, which takes into a recess 52 in the other disk or plate, 53, and the ratchet-teeth instead of being formed on the meshing faces of the practically solid wooden nave and the outer plate 53 are formed on the outer end of the bush of the plate 53 and the inner end of an additional internally-ribbed ring or collar 54 on the part 55 of the axle 56.

In applying my invention to the fixing of wire-spoked wheels to the axles of vehicles, as is illustrated in Figs. 15 and 16, I employ the internally-ribbed plates 57 58, as in the case of wooden-spoked wheels, the hub 59 replacing the wooden nave formed by the inner ends of the spokes. In this arrangement both of the plates 57 58 are formed with ratchet-teeth for bearing against ratchet-teeth on the ends or outer faces of the spoke-flanges of the hub, as will be best seen by reference to the upper half of Fig. 15.

I wish it to be understood that the invention hereinbefore described may be employed with facility in many other connections than those herein specified.

Having thus fully described my invention, what I claim as new, and desire to secure by Letters Patent, is—

1. A fastening for wheels, cranks and shafts, involving a longitudinally-grooved element, a plurality of internally-ribbed members having their ribs engaging in the grooves of said element, each of said members having a toothed face, a toothed member interposed between and engaging the teeth of said ribbed members and adapted to cause the interlocking of all of said members together, and means for securing said element and members together.

2. A fastening of the character set forth, involving the combination of a grooved element and a wheel whose nave is mounted thereon and provided on each side thereof with teeth, of a pair of internally-ribbed members mounted upon and having their ribs engaging in the groove of said element and further provided with teeth engaging in the teeth of the nave, and means for securing the nave, said members and element together.

In testimony whereof I have hereunto set my hand in presence of two subscribing witnesses.

JOHN VERNON PUGH.

Witnesses:
  RICHARD SKERRETT,
  ARTHUR J. POWELL.